United States Patent
Yu et al.

(10) Patent No.: US 9,450,984 B2
(45) Date of Patent: Sep. 20, 2016

(54) AUTOMATIC APPROACH FOR THE PERSONALIZED PRIVACY RECOMMENDATION RELATED TO THE LOCATION

(75) Inventors: Kuifei Yu, Beijing (CN); Huanhuan Cao, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/350,562

(22) PCT Filed: Oct. 17, 2011

(86) PCT No.: PCT/CN2011/080835
§ 371 (c)(1),
(2), (4) Date: Apr. 8, 2014

(87) PCT Pub. No.: WO2013/056407
PCT Pub. Date: Apr. 25, 2013

(65) Prior Publication Data
US 2014/0289850 A1    Sep. 25, 2014

(51) Int. Cl.
*H04L 29/06* (2006.01)
*H04L 29/08* (2006.01)
*H04W 8/16* (2009.01)
*H04W 12/02* (2009.01)
*H04W 4/02* (2009.01)

(52) U.S. Cl.
CPC .............. *H04L 63/20* (2013.01); *H04L 67/18* (2013.01); *H04W 8/16* (2013.01); *H04W 12/02* (2013.01); *H04W 4/02* (2013.01)

(58) Field of Classification Search
CPC .............. H04L 63/1408; H04L 63/14; H04L 63/1441; G06F 21/57; G06F 21/50
See application file for complete search history.

(56) References Cited

U.S. PATENT DOCUMENTS

| 6,360,102 B1* | 3/2002 | Havinis ............... H04L 63/102 455/411 |
| 7,088,989 B2 | 8/2006 | Guo |
| 2002/0016173 A1* | 2/2002 | Hunzinger ........... H04W 64/00 455/456.5 |
| 2002/0193941 A1* | 12/2002 | Jaeckle ............... H04W 64/00 455/456.6 |
| 2003/0008672 A1* | 1/2003 | Fujii ..................... H04L 63/08 455/456.1 |
| 2006/0165100 A1 | 7/2006 | Huang et al. |
| 2007/0061245 A1 | 3/2007 | Ramer et al. |

(Continued)

FOREIGN PATENT DOCUMENTS

| CN | 1765143 | 4/2006 |
| CN | 101194512 | 6/2008 |

(Continued)

OTHER PUBLICATIONS

International Search Report received for corresponding Patent Cooperation Treaty Application No. PCT/CN2011/080835, dated Jun. 7, 2012, 4 pages.

(Continued)

*Primary Examiner* — Yonas Bayou
(74) *Attorney, Agent, or Firm* — Mintz Levin Cohn Ferris Glovsky and Popeo, P.C.

(57) ABSTRACT

A method for personalized location privacy recommendation comprises: obtaining information of one or more locations for a user; collecting features of the one or more locations; and recommending respective privacy levels of the one or more locations automatically based at least in part on the information and the features.

26 Claims, 3 Drawing Sheets

(56) References Cited

U.S. PATENT DOCUMENTS

| | | | |
|---|---|---|---|
| 2008/0070593 A1* | 3/2008 | Altman | H04L 63/102 455/457 |
| 2008/0126961 A1 | 5/2008 | Naaman et al. | |
| 2009/0047972 A1* | 2/2009 | Neeraj | G06Q 10/10 455/456.1 |
| 2010/0004002 A1* | 1/2010 | Hahn | H04W 8/26 455/456.1 |
| 2010/0076777 A1* | 3/2010 | Paretti | G06Q 30/02 705/1.1 |
| 2010/0077484 A1 | 3/2010 | Paretti et al. | |
| 2010/0146583 A1 | 6/2010 | Prehofer et al. | |
| 2011/0072034 A1 | 3/2011 | Sly et al. | |
| 2011/0081921 A1* | 4/2011 | Casey | G01C 21/20 455/456.3 |
| 2011/0113100 A1 | 5/2011 | Chawla | |
| 2011/0190009 A1* | 8/2011 | Gerber, Jr. | H04L 63/0407 455/456.3 |
| 2011/0276565 A1* | 11/2011 | Zheng | G01C 21/20 707/724 |
| 2012/0220308 A1* | 8/2012 | Ledlie | G01S 5/0236 455/456.1 |
| 2015/0264518 A1* | 9/2015 | Dal Santo | H04W 4/02 455/456.3 |

FOREIGN PATENT DOCUMENTS

| | | | |
|---|---|---|---|
| CN | 101895866 | | 11/2010 |
| CN | 101998240 | | 3/2011 |
| CN | 101895866 B | * | 11/2012 |
| WO | 2004/075594 A1 | | 9/2004 |
| WO | 2012/019365 A1 | | 2/2012 |

OTHER PUBLICATIONS

Sampigethaya, K. et al. "AMOEBA: Robust Location Privacy Scheme for VANET", IEEE Journal on Selected Areas in Communications, vol. 25, No. 8, Oct. 2007, pp. 1569-1589.

Liu, "From Data Privacy to Location Privacy: Models and Algorithms", Proceedings of the 33rd international conference on Very large data bases, Sep. 23-28, 2007, pp. 1429-1430.

Yan et al., "A Context-Aware Recommender System for User Privacy in MANET Services", Proceedings of the 8th international conference on Ubiquitous intelligence and computing, 2011, pp. 295-309.

* cited by examiner

AUTOMATIC APPROACH FOR THE PERSONALIZED PRIVACY RECOMMENDATION RELATED TO THE LOCATION

RELATED APPLICATION

This application was originally filed as PCT Application No. PCT/CN2011/080835 filed Oct. 17, 2011.

FIELD OF THE INVENTION

The present invention generally relates to security and privacy protection. More specifically, the invention relates to location-based privacy recommendation.

BACKGROUND

The modern communications era has brought about a tremendous expansion of communication networks. Communication service providers and device manufacturers are continually challenged to deliver value and convenience to consumers by, for example, providing compelling network services, applications, and content. The developments of communication technologies have contributed to an insatiable desire for new functionality. Portable communication apparatuses (for example, mobile phones) are no longer just tasked with making telephone calls. They have become integral, and in some cases essential, tools for managing the professional and/or personal life of users. Recently, Location Based Service (LBS) becomes more and more popular. With the prevalence of LBSs, good privacy protection plays an important role in personal location management and services.

SUMMARY

The present description introduces an automatic approach for discovering the personalized important locations (for example, significant places, routes and/or areas) for users and then recommending their privacy levels.

According to a first aspect of the present invention, there is provided a method comprising: obtaining information of one or more locations for a user; collecting features of the one or more locations; and recommending respective privacy levels of the one or more locations automatically based at least in part on the information and the features.

According to a second aspect of the present invention, there is provided an apparatus comprising: at least one processor; and at least one memory including computer program code, the at least one memory and the computer program code configured to, with the at least one processor, cause the apparatus to perform at least the following: obtaining information of one or more locations for a user; collecting features of the one or more locations; and recommending respective privacy levels of the one or more locations automatically based at least in part on the information and the features.

According to a third aspect of the present invention, there is provided a computer program product comprising a computer-readable medium bearing computer program code embodied therein for use with a computer, the computer program code comprising: code for obtaining information of one or more locations for a user; code for collecting features of the one or more locations; and code for recommending respective privacy levels of the one or more locations automatically based at least in part on the information and the features.

According to a fourth aspect of the present invention, there is provided an apparatus comprising: obtaining means for obtaining information of one or more locations for a user; collecting means for collecting features of the one or more locations; and recommending means for recommending respective privacy levels of the one or more locations automatically based at least in part on the information and the features. In an exemplary embodiment, the apparatus may further comprise providing means for providing predefined candidate services for the user at the one or more locations based at least in part on the respective privacy levels.

According to various exemplary embodiments, said obtaining the information of the one or more locations may comprise mining data related to at least one of the following for the user: significant places, routes and areas. For example, said mining the data may comprise getting an overall sight of the user's social network. According to various exemplary embodiments, said recommending the respective privacy levels of the one or more locations automatically may comprise classifying the one or more locations into different privacy levels according to a predefined criterion based at least in part on the information and the features. The predefined criterion may comprise one or more rules for mapping the one or more locations to corresponding privacy levels. For example, the features of the one or more locations may comprise the user's individual context and/or social context. The user's individual context and social context may comprise at least one of the following: a pattern of visiting the one or more locations by the user; application usage records for the user at the one or more locations; information related to the one or more locations from social networking services or contacts of the user; and labels assigned to the one or more locations by the user.

According to various exemplary embodiments, the respective privacy levels of the one or more locations may be changeable manually by the user. Based at least in part on the respective privacy levels, one or more predefined candidate services may be provided to the user at the one or more locations. For example, the predefined candidate services may comprise at least one of the following: presenting to the user a map view on which the one or more locations are recommended the respective privacy levels; pushing information which the user and/or at least one of the user's friends may be interested in; launching one or more applications automatically at a location with low privacy level; prompting, at a location with high privacy level, the user that privacy data of the user is being obtained by an application; and tuning device configurations for the user. In an exemplary embodiment, said launching the one or more applications automatically at the location with low privacy level may comprise sharing private data of the user with another user granted by the user, for example, through short range communications. The private data may be assigned a secrete level based at least in part on the privacy level of the location.

In exemplary embodiments of the present invention, the provided method, apparatus, and computer program product can enable good privacy protection in personal location management by discovering significant place (SP) of a user and then recommending the respective privacy level. With the recommended privacy levels, the user could be provided with one or more proper services and even share different privacy data (such as phonebook, photo, music, location and/or the like) confidently with another user at each SP.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

Figure 1:
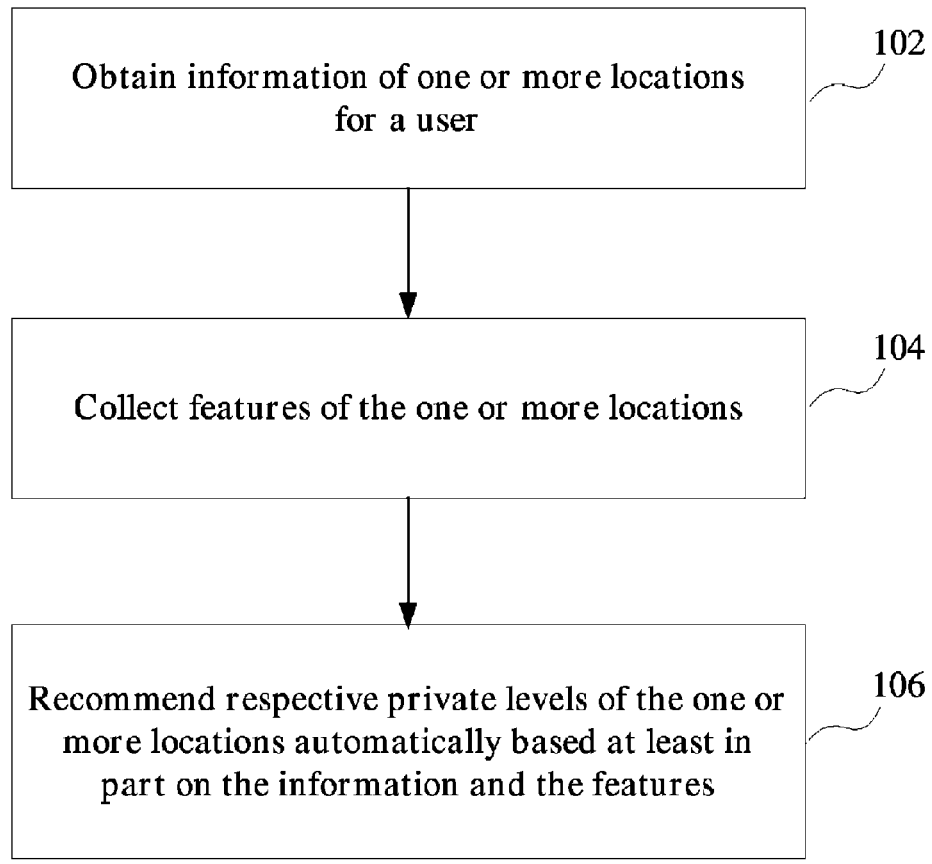
FIG. 1 is a flowchart illustrating a method for personalized location privacy recommendation in accordance with embodiments of the present invention.

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The LBS is widely commercialized. From one hand, it offers the great consumer value such as nearby search, targeted recommendation. On the other hand, it has also potential to expose a user's privacy. In order to ensure a user's privacy, one solution is to prevent other unauthorized parties from learning the user's current or past privacy data such as location. Another solution is to send out the obfuscation of context data of a user to a third party to protect privacy data of the user. Alternatively, the user can expose his/her privacy data in different ways to trusted parties and non-trusted parties. However, the automatic approach for personalized location privacy recommendation is still underexplored. Moreover, it is of great importance to balance the consumer value and the privacy intrusion.

In LBS applications, it is desirable that users can manage their locations by manually tagging or accepting a system recommendation. Intuitively, different locations may have different levels of privacy for users. Recommending different privacy levels for different locations may help to recommend proper services to users. For example, if a location is recognized as a public place for a user, a device held by the user, such as user equipment, mobile phone, wireless terminal, portable computer and etc., can suggest the user to enable automatically check-in function at this location. If a location is recognized as a private place for the user, the device would make an alert when some applications running on the device are positioning the device. Thus it can be seen that it is desirable to auto-label the SPs/Routes/Areas with different privacy levels for a user so that the user would be given a recommendation on one or more services or applications based at least in part on the privacy level of each SP/Route/Area of the user. It is also desirable for the user to check and/or control the recommended privacy level manually and to perform a privacy data sharing policy at the SPs/Routes/Areas considering different privacy levels.

FIG. 1 is a flowchart illustrating a method for personalized location privacy recommendation in accordance with embodiments of the present invention. In the illustrated embodiment, the apparatus at which the method illustrated in FIG. 1 may be implemented is a mobile terminal and can be connected to a cellular network by a wireless link. However, it should be noted that the apparatus can be any type of fixed terminal, mobile terminal, or portable terminal comprising desktop computers, laptop computers, handsets, stations, units, devices, multimedia tablets, Internet nodes, communicators, Personal Digital Assistants (PDAs), or any combination thereof.

As shown in FIG. 1, the apparatus obtains information of one or more locations for a user in block 102. In an exemplary embodiment, said obtaining the information of the one or more locations may comprise mining data related to at least one of significant places, routes and areas for the user. For example, such data can be mined from the user's Global Positioning System (GPS) trajectories or cell ID trajectories, which may be collected for example through mobile devices for mining significant places. Thus the works can be grouped into two categories: GPS trajectory based important location (such as significant places, routes and/or areas) mining and cell ID trajectory based important location mining. Compared with GPS trajectory based important location mining, cell ID trajectory based mining may be more practical because the collection of cell ID trajectories is much less energy consuming. According to an exemplary embodiment, an effective approach is proposed for mining important locations from cell ID trajectories by leveraging the cell-site information. The approach segments a cell ID trajectory as several stay sessions and removes cell IDs which imply the user is moving or on the way to somewhere but not staying. Then it mines locations such as significant places/routes/areas from the remaining cell IDs.

Alternatively or additionally, one important factor in mining significant places/routes/areas for a user is the opinion of his/her friends. For example, if most of the user's friends take a place as a significant place, the place is most likely a significant place for the user. To leverage this factor in mining the place, an overall sight of the user's social network and the significant places to the social network need to be collected. Thus, mining the data related to at least one of significant places, routes and areas for the user may comprise getting an overall sight of the user's social network. In accordance with an exemplary embodiment, alternatives to get the overall sight of the social network may comprise: users upload their significant places/routes/areas to a server and they declare the social relationships, such as friendships, on the server; and/or users share their significant places/routes/areas by means of the short range communication methods. The former scheme is straight forward such as building up a social network like Facebook or Tweeter, and then the data related to at least one of significant places, routes and areas for a user may be mined on a server for the social network. For the latter scheme, it is assumed that the friendship is implied by the position relationship, so that the significant places/routes/areas of persons nearby a user are taken as the significant places/routes/areas of the user's friends. Then the significant places/routes/areas for the user can be mined for example on a device held by the user.

In block 104, the apparatus collects features of the one or more locations for the user. According to an exemplary embodiment, these features may comprise at least one of the user's individual context and social context. For example, the user's individual context and social context may comprise at least one of the following: a pattern of visiting the one or more locations by the user, application usage records for the user at the one or more locations, information related to the one or more locations from Social Networking Services (SNSs) or contacts of the user, labels assigned to the one or more locations by the user, and the like.

Then the apparatus can automatically recommend respective privacy levels of the one or more locations based at least in part on the information and the features, as shown in block 106. According to an exemplary embodiment, said recommending the respective privacy levels of the one or more locations automatically may comprise classifying the one or more locations into different privacy levels according to a predefined criterion based at least in part on the information and the features. The predefined criterion may comprise one or more rules for mapping the one or more locations to corresponding privacy levels. It is contemplated that taking advantages of machine learning technology, the one or more locations obtained for the user at block 102 can be automatically classified into several privacy levels according to corresponding individual and/or social context of the user. Then a location privacy recommendation can be made to the user according to the classification. In order to train a classifier for automatic important location classification, some training data which may contain the locations' features and/or user labels for the privacy levels need to be collected, as shown in block 104. According to exemplary embodiments, given a classifier, some features of a location can be used for classifying its privacy level, for example, the time information of visiting the location (such as day or night, week day or week end), application usage at the location (such as check-in records or check-in history, long time stand by, gaming), important location information from the SNS and contacts/friends (such as, Is the location same as many friends' locations? If so, then this location may have same property as that of those friends' locations) and so on. With the collected features, the location classification can be conducted by many classifications approaches such as Support Vector Machine (SVM), Decision tree, Naïve bayes and the like.

Figure 2:
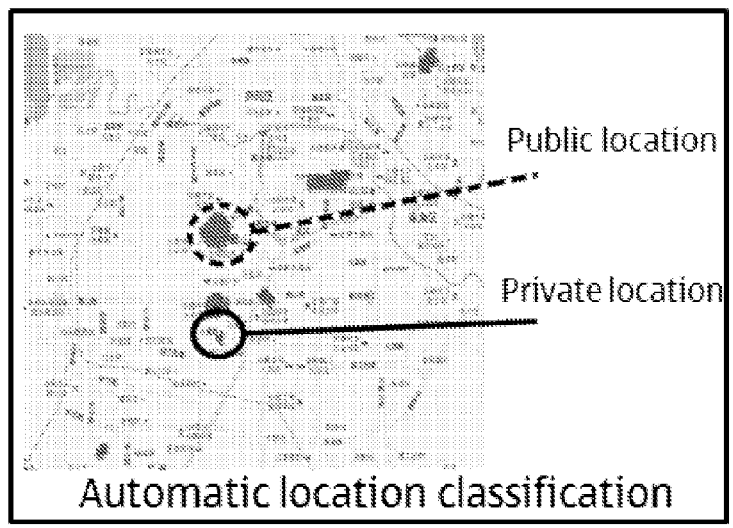
FIG. 2 exemplarily shows automatic location classification in accordance with an embodiment of the present invention.

FIG. 2 exemplarily shows automatic location classification in accordance with an embodiment of the present invention. As shown in FIG. 2, all or some of significant places/route/areas mined for a user can be automatically classified into different privacy levels and presented to the user, for example, by a map view with different marks such as colors or symbols. As an example, two different privacy levels such as private location (marked by a solid circle) and public location (marked by a dashed circle) are shown in FIG. 2. It should be noted that these two privacy levels can be further classified into several sub-levels, or more than two privacy levels may be defined initially. The mapping relationship between the privacy levels and the collected features for a location of a user also can be predefined or preconfigured. In an exemplary embodiment, the respective privacy levels of one or more locations may be changeable manually by the user. As an example, the user can modify the classification results or accept it by default. There may be many user interface (UI) forms to let the user edit the classification results, such as a list, a menu, a dialog box and/or the like.

According to exemplary embodiments, the method as illustrated in FIG. 1 may further comprise providing predefined candidate services for the user at the one or more locations based at least in part on the respective privacy levels. The predefined candidate services may comprise at least one of the following: presenting to the user a map view on which the one or more locations are recommended the respective privacy levels; pushing information which the user and/or at least one of the user's friends may be interested in; launching one or more applications automatically at a location with low privacy level; prompting, at a location with high privacy level, the user that privacy data of the user is being obtained by an application; tuning device configurations for the user, and etc. For example, when entering a certain area or staying at a specified location, a user may be provided with recommendation or advertisement information based at least in part on the respective privacy level. When the user is detected in his/her private location (for example hospital, private-club, home), then the user may be only recommended applications or sales information that he/she may be interested in. While if the user goes to his/her public location (for example shopping mall), then the user may be pushed not only information that he/she may be interested in, but also those information that one or more of his/her friends may be interested in, so that the user is enabled to share what he/she finds to his/her friends.

Figure 3:
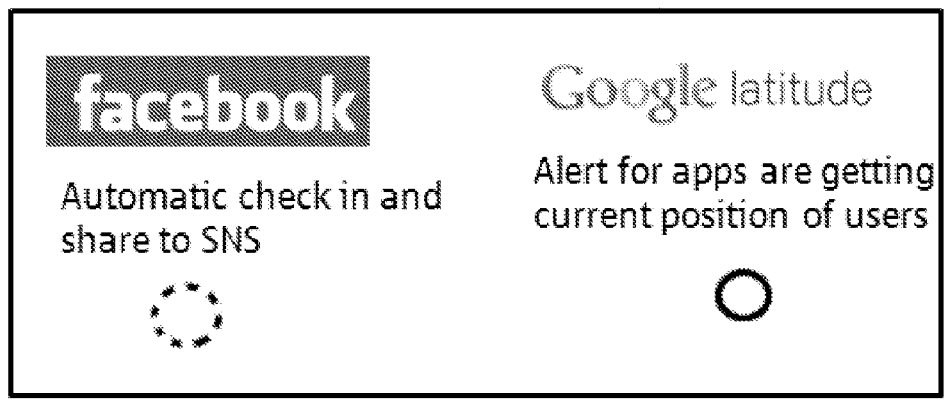
FIG. 3 exemplarily shows different services recommended for public and private locations in accordance with an embodiment of the present invention.

FIG. 3 exemplarily shows different services recommended for public and private locations in accordance with an embodiment of the present invention. This figure illustrates how service recommendations may be made according to different privacy levels of a user's significant places. Two different privacy levels such as private location (marked by a solid circle) and public location (marked by a dashed circle) are shown in FIG. 3 and corresponding candidate services and/or actions may be predefined. It will be appreciated that the privacy levels may comprise more than two levels (such as public and private) and that the mapping relationship between the privacy levels and candidate services for a user can be specified or predefined by the user or a service provider. In this way, these predefined candidate services and/or actions, such as presenting a privacy map, auto-check into social networks, device basic behaviors tuning and the like, can be recommended for different significant places of the user. For example, the user may be recommended a service like "Alert me if some applications (such as Google latitude) are obtaining my locations when I am on private locations" or "Automatically check in when I am on public locations and share it to Facebook". Once the user accepted the recommendation, for example, if the user is recognized on a private location, such as a bar or a club, an alert of "Google latitude is obtaining your current position" may pop up. In an exemplary embodiment, some configurations of an apparatus held by the user may be adjusted (such as device basic behaviors tuning) with the varying locations of the user. As an example, the connectivity of Blue-tooth/WiFi on the apparatus may be turned on in public locations for the user, and turned off in private locations, which is good in power consuming perspectives.

As another example, a profile of the apparatus may be set as in a general mode for public locations of the user, and in a pager/silent mode for private locations of the user.

Thus it can be seen that once privacy levels of one or more locations for a user have been inferred according to the proposed solution and optionally confirmed by the user, it would be recommended, according to the privacy levels of the one or more locations, to automatically launch one or more applications (such as, mobile applications such as sharing data, check-in, tuning device configurations and etc.) for example at the locations with low privacy levels. In an exemplary embodiment, a user's device to which the proposed automatic approach for personalized location privacy recommendation is applied can suggest performing automatically check-in and sharing some information of the user to the Facebook friends of the user when he/she stays in a place which has been recognized as a significant place with low privacy level, such as a restaurant, park and shopping mall. Alternatively or additionally, the user may have a map with respective privacy level on each significant place. The user could manually, for each significant place, select which category of privacy data are accessible, for example, based at least in part on the inferred privacy level.

According to exemplary embodiments, launching one or more applications automatically at the location with low privacy level may comprise sharing private data of a user with another user granted by the user, for example, through short range communications. The private data may be assigned a secrete level based at least in part on the privacy level of the location. For example, private data of a user may be divided into two categories: (1) private data which have location attributes by nature, such as Photo (where the photo is taken) and Current Position; and (2) private data which have no obvious location attributes, such as Contacts, Calendar, Notes, Bookmarks, Short Massaging Services (SMS) and so on. The private data can be mapped to the corresponding secret level with different approaches for these two different categories. For category (1), private data of a user may be assigned a respective secrete level which is normally equal to a privacy level of a location associated with location attributes for the private data, such as the location where a photo is taken, and the location of a current position. The assigned secrete level of the private data could be modified by the user. When a privacy level is recommended to a place as shown in FIG. 1, for example, the private data of category (1) with a secret level less than the privacy level of the place may be accessible with short range access methods. For category (2), private data of a user may be assigned a respective secrete level according to characteristics of the private data, the user's preferences and/or the like. For example, the mapping relationships between private data of category (2) and secret levels may comprise: Contacts—5, Calendar—4, Notes—5, Bookmarks—3 and SMS—5, where the integral values from 1 to 5 represent respective secret levels of private data. It should be noted that the secret levels may be ranked by integral and/or nonintegral numbers within other ranges of values, or may be represented by other symbols or marks which can distinguish different secret levels. In an exemplary embodiment, a user may be prompted with a private data list for manual selection at a significant place. In the private data list, some private data may be checked by default according to the secret levels of the private data (which can be set by default or manually defined by the user) and the privacy level of the place to ease the operation. Considering security and privacy of a user, for example, the private data sharing may be only available with short distance communication methods like Bluetooth. It means that only the guys near the user could access the user's private data if the secret level of the private data grants the right of access.

The various blocks shown in FIG. 1 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented method. Other steps and methods may be conceived that are equivalent in function, logic, or effect to one or more steps, or portions thereof, of the illustrated method. Additionally, the order in which a particular method occurs may or may not strictly adhere to the order of the corresponding steps shown. By applying the proposed approach, one or more locations (such as significant places/routes/areas) of a user can be discovered and then respective privacy levels may be recommended automatically for the one or more locations of the user based at least in part on certain features (such as individual and/or social contexts of the user) collected for the one or more locations. According to exemplary embodiments, it is easy for the user to check and control the privacy levels manually, for example, the user can manually modify privacy profiles for at least one of the one or more locations. With the recommended privacy level, one or more services and/or actions may be applied to the user according to a criterion predefined by the user or by default, when he/she is located in a corresponding place or entering a corresponding area. Moreover, the user could confidently share different privacy data (such as phonebook, photo, music, location and/or the like) at respective significant places/routes/areas according to a predefined policy for privacy data sharing. Thus the user could do less and get more, while from a perspective of service providers such as Internet Service Providers (ISPs), they can get active users with high involvement.

Figure 4:
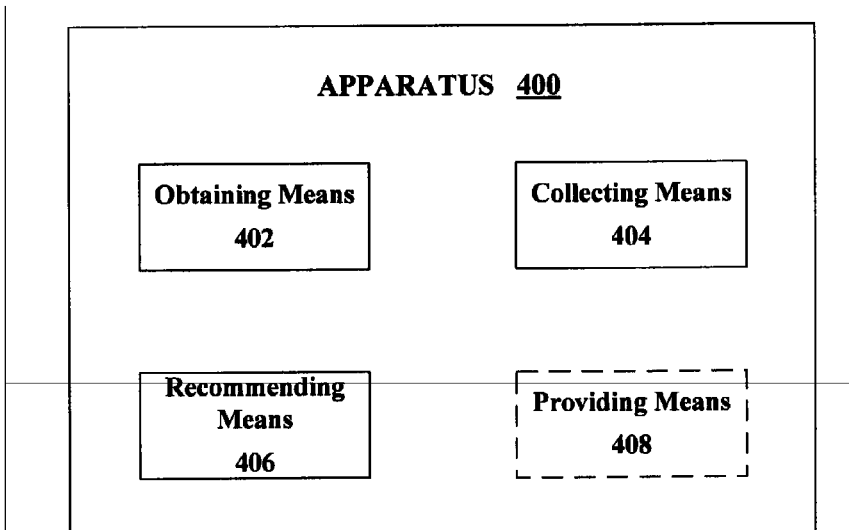
FIG. 4 is a simplified block diagram of an apparatus which is suitable for use in practicing exemplary embodiments of the present invention.

FIG. 4 is a simplified block diagram of an apparatus which is suitable for use in practicing exemplary embodiments of the present invention. The apparatus 400 shown in FIG. 4 may comprise various means, modules and/or components for implementing functions of the foregoing steps and method in FIG. 1. In an exemplary embodiment, the apparatus 400, such as a user equipment, mobile terminal, a portable device or the like, may comprise: obtaining means 402 for obtaining information of one or more locations for a user; collecting means 404 for collecting features of the one or more locations; and recommending means 406 for recommending respective privacy levels of the one or more locations automatically based at least in part on the information and the features. The obtaining means 402 can mine data related to significant places, routes and/or areas of the user. The recommending means 406 can classify the one or more locations into different privacy levels according to a predefined criterion, for example, based at least in part on the information obtained by the obtaining means 402 and the features collected by the collecting means 404. The predefined criterion may comprise various rules for mapping the one or more locations into respective privacy levels, for example, considering the user's individual context and/or social context from the collecting means 404. Optionally, the respective privacy levels of the one or more locations may be changeable manually by the user, for example, through interactions with the apparatus 400. Alternatively, the apparatus 400 may also comprise providing means 408 (shown by dashed block in FIG. 4) for providing predefined candidate services for the user at the one or more locations based at least in part on the respective privacy levels. For example, such predefined candidate services may comprise at least one of the following: presenting to the user a map view on which the one or more locations are recommended the respective privacy levels; pushing information which the user and/or at least one of the user's friends may be interested in (such as advertisement or promotion information); launching one or more applications automatically at a location with low privacy level (such as sharing private data of the user with another user granted by the user); prompting, at a location with high privacy level, the user that privacy data of the user is being obtained by an application; tuning device configurations for the user (such as setting profile or working mode for the user's device); and any other suitable applications and/or actions which can be applied to the user according to the recommended privacy levels.

Many of the functional units described herein have been labeled as modules or means, in order to more particularly emphasize their implementation independence. For example, a module/means may be implemented as a hardware circuit or in programmable hardware devices. Modules/means may also be implemented in software for execution by various types of processors. Nevertheless, the executables of the modules/means need not be physically located together, but may comprise disparate instructions stored in different locations which, when joined logically together, comprise the modules/means and achieve the stated purpose for the modules/means. Furthermore, modules/means may also be implemented as a combination of software and one or more hardware devices. For instance, a module/means may be embodied in the combination of software executable codes stored on a memory device. In a further example, a module/means may be the combination of a processor that operates on a set of operational data. Still further, a module/means may be implemented in the combination of electronic signals communicated via transmission circuitry.

Figure 5:
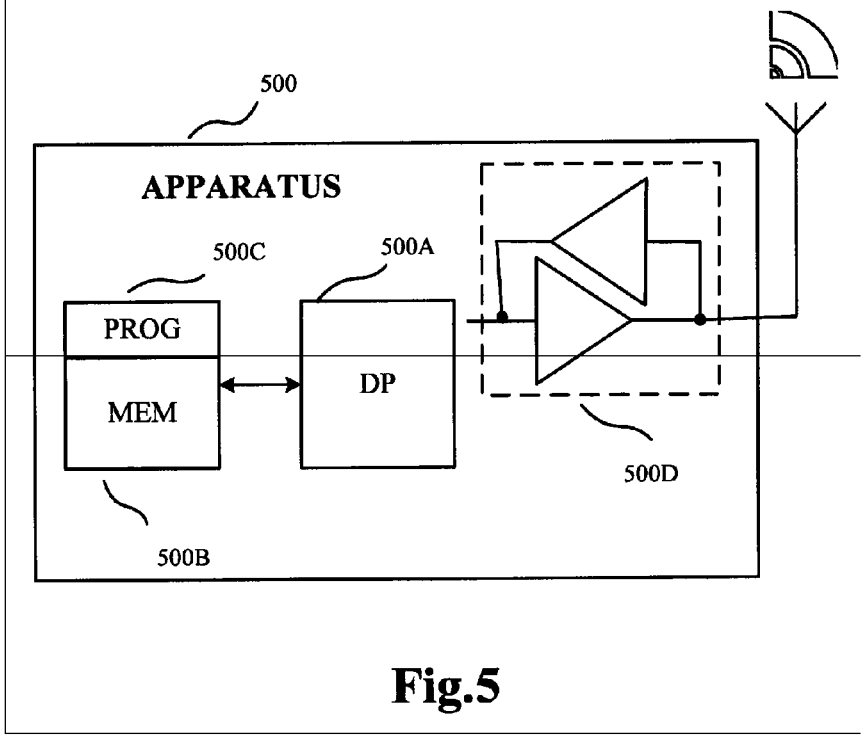
FIG. 5 is a simplified block diagram of another apparatus which is suitable for use in practicing exemplary embodiments of the present invention.

FIG. 5 is a simplified block diagram of another apparatus which is suitable for use in practicing exemplary embodiments of the present invention. In FIG. 5, the apparatus 500 such as user equipment, mobile phone, wireless terminal and etc. may be adapted for communicating with another apparatus (not shown) directly or through a network node such as base station, Node B, evolved Node B (eNB), control center, access point (AP) and/or the like. The apparatus can be any type of fixed terminal, mobile terminal, or portable terminal comprising desktop computers, laptop computers, handsets, stations, units, devices, multimedia tablets, Internet nodes, communicators, PDAs, or any combination thereof. In an exemplary embodiment, the apparatus 500 may comprise a data processor (DP) 500A, a memory (MEM) 500B that stores a program (PROG) 500C, and a suitable transceiver 500D for communicating with another apparatus, a network node, a server and so on. For example, the transceiver 500D may be an integrated component for transmitting and/or receiving signals and messages. Alternatively, the transceiver 500D may comprise separate components to support transmitting and receiving signals/messages, respectively. The DP 500A may be used for processing these signals and messages.

The PROG 500C is assumed to comprise program instructions that, when executed by the DP 500A, enable the apparatus to operate in accordance with the exemplary embodiments, as discussed above. That is, the exemplary embodiments of the present invention may be implemented at least in part by computer software executable by the DP 500A of the apparatus 500, or by hardware, or by a combination of software and hardware.

The MEM 500B may be of any type suitable to the local technical environment and may be implemented using any suitable data storage technology, such as semiconductor based memory devices, flash memory, magnetic memory devices and systems, optical memory devices and systems, fixed memory and removable memory. The DP 500A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method, comprising:
   determining a location of a user equipment associated with a user;
   determining a feature of the location, wherein the feature includes a pattern of visiting the location by the user;
   determining a privacy level for the location based at least in part on the location and the feature;
   launching, when the location corresponds to a low privacy level, one or more applications at the location; and sharing, when the location corresponds to the low privacy level, private data of the user with another user granted access to the private data by the user, wherein the determining the location, the determining the feature, the determining the privacy level, the launching, and the sharing are performed using at least one processor.

2. The method according to claim 1, wherein the privacy level of the location is changeable manually by the user.

3. The method according to claim 1, wherein the feature of the location further includes at least one of the user's individual context and social context.

4. The method according to claim 3, wherein the user's individual context and social context comprise at least one of:
one or more application usage records for the user at the location;
information related to the location from social networking services or one or more contacts of the user; and
a label assigned to the location by the user.

5. The method according to claim 1, further comprising:
providing candidate services for the user at the location based at least in part on the privacy level.

6. The method according to claim 5, wherein the candidate services comprise at least one of:
presenting to the user a map view including the location and determined privacy level;
pushing information which the user or at least one of the user's friends is interested in;
notifying, when the location corresponds to a high privacy level, the user that privacy data of the user is being obtained by an application; and
adjusting a device configuration for the user.

7. The method according to claim 6, wherein the private data is assigned a secrecy level based at least in part on the privacy level.

8. The method according to claim 1, wherein the location includes data comprising mining data related to the user and at least one of: significant places, routes, or areas.

9. The method according to claim 8, wherein mining the data includes information from to the user's social network.

10. The method according to claim 1, further comprising:
classifying the location into the privacy level according to at least the location and the feature, wherein the privacy level is one of a plurality of privacy levels.

11. The method according to claim 1, further comprising:
recommending a first privacy level to the user based on the location and the feature; and
displaying the recommended first privacy level.

12. The method according to claim 1, wherein the low privacy level corresponds to a public location.

13. The method according to claim 1, wherein private data includes information related to the user including one or more of the location, a contact, a calendar entry, a note, a bookmark, or a short messaging service communication.

14. An apparatus, comprising:
at least one processor; and
at least one memory including computer program code,
the at least one memory and the computer program code configured to, with the at least one processor, cause the apparatus to:
determine a location of a user equipment associated with a user;
determine a feature of the location, wherein the feature includes a pattern of visiting the location by the user;
determine a privacy level for the location and the feature;
launch, when the location corresponds to a low privacy level, one or more applications at the location; and
share, when the location corresponds to the low privacy level, private data of the user with another user granted access to the private data by the user.

15. The apparatus according to claim 14, wherein the privacy level of the location is changeable manually by the user.

16. The apparatus according to claim 14, wherein the feature of the location includes at least one of the user's individual context and social context.

17. The apparatus according to claim 16, wherein the user's individual context and social context further comprise at least one of the following:
one or more application usage records for the user at the location;
information related to the location from social networking services or one or more contacts of the user; and
a label assigned to the location by the user.

18. The apparatus according to claim 14, wherein the apparatus is further caused to:
provide candidate services for the user at the location based at least in part on the privacy level.

19. The apparatus according to claim 18, wherein the candidate services comprise at least one of:
present to the user a map view including the location and determined privacy level;
push information which the user or at least one of the user's friends is interested in;
notify, when the location corresponds to a high privacy level, the user that privacy data of the user is being obtained by an application; and
adjust device configuration for the user.

20. The apparatus according to claim 19, wherein the private data is assigned a secrecy level based at least in part on the privacy level associated with the location.

21. The apparatus according to claim 14, wherein the location includes data comprising mine data related to the user and at least one of: significant places, routes, or areas.

22. The apparatus according to claim 21, wherein the mine the data includes information from the user's social network.

23. The apparatus according to claim 14, wherein the low privacy level corresponds to a public location.

24. The apparatus according to claim 14, wherein private data includes information related to the user including one or more of the location, a contact, a calendar entry, a note, a bookmark, or a short messaging service communication.

25. A non-transitory computer readable medium bearing computer program code that, when executed by at least one processor, cause operations comprising:
determining a location of a user equipment associated with a user;
determining a feature of the location, wherein the feature includes a pattern of visiting the location by the user;
determining a privacy level for the location based at least in part on the location and the feature;
launching, when the location corresponds to a low privacy level, one or more applications at the location; and
sharing, when the location corresponds to a low privacy level, private data of the user with another user granted access to the private data by the user.

26. The non-transitory computer readable medium according to claim 25, wherein the privacy level of the location is changeable manually by the user.

* * * * *